United States Patent [19]
Bhattacharyya et al.

[11] Patent Number: 6,103,121
[45] Date of Patent: Aug. 15, 2000

[54] MEMBRANE-BASED SORBENT FOR HEAVY METAL SEQUESTRATION

[75] Inventors: Dibakar Bhattacharyya; Leonidas G. Bachas, both of Lexington, Ky.; Lawrence Cullen, Leeds, United Kingdom; Jamie A. Hestekin, Lexington, Ky.; Subhas K. Sikdar, Blue Ash, Ohio

[73] Assignee: University of Kentucky Research Foundation, Lexington, Ky.

[21] Appl. No.: 09/076,204

[22] Filed: May 12, 1998

Related U.S. Application Data

[62] Division of application No. 08/740,574, Oct. 31, 1996, abandoned.

[51] Int. Cl.[7] ............................................. B01D 71/10
[52] U.S. Cl. .......................... 210/500.29; 210/500.3; 210/500.37; 210/638; 210/651
[58] Field of Search ................. 210/500.23, 500.29, 210/500.3, 500.31, 500.32, 500.37, 500.38, 500.39, 490, 638, 651; 427/245

[56] References Cited

U.S. PATENT DOCUMENTS

| | | | |
|---|---|---|---|
| 3,948,863 | 4/1976 | Akamatsu et al. | 210/38 |
| 3,951,920 | 4/1976 | Senoo | 210/500.29 |
| 4,092,250 | 5/1978 | Sano et al. | 210/501 |
| 4,125,462 | 11/1978 | Latty | 210/500.29 |
| 4,302,336 | 11/1981 | Kawaguchi et al. | 210/654 |
| 4,356,267 | 10/1982 | Callegaro | 210/321.3 |
| 4,360,434 | 11/1982 | Kawaguchi et al. | 210/500.2 |
| 4,388,189 | 6/1983 | Kawaguchi et al. | 210/490 |
| 4,604,204 | 8/1986 | Linder et al. | 210/500.3 |
| 4,824,870 | 4/1989 | Pemawansa et al. | 521/53 |
| 4,873,033 | 10/1989 | Heckmann et al. | 264/41 |
| 4,915,839 | 4/1990 | Marinaccio et al. | 210/500.23 |
| 4,961,852 | 10/1990 | Pemawansa et al. | 210/490 |
| 4,983,291 | 1/1991 | Chau et al. | 210/500.37 |
| 5,015,387 | 5/1991 | Nemori | 210/500.29 |
| 5,071,880 | 12/1991 | Sugo et al. | 521/27 |
| 5,087,372 | 2/1992 | Toyomoto et al. | 210/651 |
| 5,093,486 | 3/1992 | Diamantoglou | 536/20 |
| 5,098,569 | 3/1992 | Stedronsky | 210/500.29 |
| 5,152,894 | 10/1992 | Haubs | 210/500.38 |
| 5,286,449 | 2/1994 | Kuroda et al. | 210/500.23 |
| 5,403,750 | 4/1995 | Braatz et al. | 436/531 |
| 5,904,848 | 5/1999 | Wong | 210/500.36 |

OTHER PUBLICATIONS

Grigory I. Tysin et al. "Cellulose Fibrous Sorbents with Conformationally Flexible Aminocarboxylic Groups for Preconcentration of Metals," Mikrochimica Acta, Springer–Verlag 1991 (Austria), No. III, pp. 53–60 (Aug. 13, 1991).

S. Krishnamurthy & Raymond M. Frederick, "Using Biopolymers to Remove Heavy Metals from Soil and Water," Remediation/Spring, 1994, UMI Article Clearinghouse (USA), No. spr, pp. 235–244, (Aug. 13, 1994).

John R. Deans & Brian G. Dixon, "Uptake of Pb2+ and Cu2+ by Novel Biopolymers," Cape Cod Research, Pergamon Press (Great Britain), vol. 26 (No. 4), pp. 469–472, (Aug. 13, 1992).

(List continued on next page.)

*Primary Examiner*—Ernest G. Therkorn
*Attorney, Agent, or Firm*—King and Schickli, PLLLC

[57] ABSTRACT

A process is provided for making membrane-based sorbents with enhanced binding activity that are particularly useful for heavy metal sequestration. The process includes the step of selectively hydrolyzing a polyacetylated membrane in order to deacetylate a surface layer of said membrane and expose free hydroxyl groups. This is followed by the oxidizing of the hydroxyl groups to aldehyde groups. This is then followed by the attaching of a polycarboxylic acid such as a polyamino acid, polyalkenoic acid or polypeptide to the membrane through the aldehyde groups. Preferably, the hydrolyzing step is completed under alkaline conditions and the oxidizing step is completed using an aqueous solution of sodium periodate.

6 Claims, 3 Drawing Sheets

OTHER PUBLICATIONS

Stanley R. Sandler & Wolf Karo, "Organic Functional Group Preparations," Academic Press (New York & London), pp. 246–267 (Aug. 13, 1971).

Technical Information Bulletin No. AL–142 Aldrich Ion–Exchange Resins and Related Polymeric Adsorbents| Undated pp. 1–4.

Roy L. Whistler Methods in Carbohydrate Chemistry Academic Press, New York and London, 1963, pp. 164–168.

Roger W. Binkley Modern Carbohydrate Chemistry Marcel Dekker, New York, Undated p. 232.

MEMBRANE-BASED SORBENT FOR HEAVY METAL SEQUESTRATION

This application is a divisional of U.S. patent application Ser. No. 08/740,574, filed Oct. 31, 1996, now abandon.

This invention was made with partial government support under NSF Grant No. 4-32118 and US EPA Grant No. 4-29695. The government may have certain rights in this invention.

TECHNICAL FIELD

The present invention relates generally to chemically activated high capacity porous membranes.

BACKGROUND OF THE INVENTION

Various sorbents/ion exchange materials are available for metal ion sequestration. Unfortunately, however, all of these suffer from the disadvantage that they possess at most two or three functional groups capable of metal ion interaction per attachment site. Additionally, these conventional materials are in bead (porous) form and thus, are not suited for effective utilization in convective flow applications.

As a specific example of this, ion-exchange resins (IERs), such as strong acid or weak acid cationic exchangers, have been used extensively to recover heavy metals and/or to prepare high quality water. The typical theoretical capacity of these IERs is five meq/gram (see "Ion-Exchange Resins and Related Polymeric Adsorbents", Technical Bulletin AL-142, Aldrich Chemical Company). This capacity is quite low. For example, if one considers a typical charged metal ion such as nickel (II) a maximum uptake of only 0.15 gram of metal per gram of IER is possible. Further, the requirement for the regeneration of these IERs is a serious disadvantage as it produces concentrated waste solutions. Still further, the use of ion exchange beads requires column operations with high pressure drops and the rate of metal ion uptake is thereby limited by diffusion control.

Of course, there are many industrial situations where it is required to convert metal ions from the solution state to a solid form. This is done in order to facilitate the disposal of such metal species. In still other situations subsequent regeneration is not a consideration and/or a liquid volume reduction and entrapment of low levels of radioactive ions in a solid form is required. In these instances and applications, IERs have a significant cost disadvantage.

It is known, however, that liquid volume reduction and metal ion entrapment may be achieved using inexpensive, commercially available, high molecular weight cut-off ultrafiltration or microfiltration membranes in which internal surface areas range from 50–200 $m^2/gm$. The most inexpensive materials used to prepare such membranes are cellulose and its derivatives, cellulose acetate and cellulose triacetate. Examples of such membranes are disclosed, for example, in U.S. Pat. Nos. 4,824,870 and 4,961,852 both to Pemawansa et al. as well as U.S. Pat. No. 4,604,204 to Lender et al.

Both flat sheet and wide bore hollow fiber (200–300 μm in diameter) configurations are readily available commercially. However, direct use of these membranes for adsorption of a metal ion such as nickel (II) assuming the size of 6 Å for the hydrated metal ion species and an internal surface of 100 $m^2/gr$ of membrane, yields a maximum surface entrapment capacity of 0.034 grams of nickel per gram of membrane. This, of course, is too low for efficient liquid volume reduction. In fact, where only single complexation sites are available, one will require a relatively high surface area of membrane (approximately 3000 $m^2/gm$) in order to achieve a 1 gram of nickel uptake per gram of membrane. A need is therefore identified for an improved chemically activated microporous membrane (includes ultrafiltration and microfiltration membranes) that may be utilized for heavy metal ion sequestration and other purposes and that is characterized by a relatively high entrapment capacity heretofore unavailable in the art.

SUMMARY OF THE INVENTION

Accordingly, it is a primary object of the present invention to provide a chemically activated microporous membrane, including both ultrafiltration and microfiltration membranes, characterized by significantly enhanced surface entrapment capacity that is relatively easy to produce.

Another object of the present invention is to provide a chemically activated microporous membrane wherein polycarboxylic acids (such as polyamino acids), polyalkenoic acids and polypeptides are chemically attached to the membrane in order to provide a relatively large number (e.g. 20–1000) of functional groups capable of metal ion interaction per membrane attachment site.

Still another aspect of the present invention is to provide a unique and novel method for the preparation of high capacity chemically activated microporous membranes formed from polyhydroxylated polymer material by means of the attachment of polycarboxylic acids to the membranes.

Still another object of the present invention is to provide a process for the sequestration of heavy metal ions utilizing high capacity cellulosic membranes.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a process is provided for making chemically activated microporous membranes or membrane-based sorbents. The process includes the step of selectively hydrolyzing a membrane formed from a polyacetylated material such as the cellulose derivatives cellulose acetate, cellulose diacetate and cellulose triacetate in order to deacetylated a surface layer of the membrane and thereby expose free hydroxyl groups. Other polyhydroxylated polymers can also be used. Next is the oxidizing of the exposed free hydroxyl groups to aldehyde groups. Any membrane materials containing aldehyde groups can also be used. This is followed by the attaching of a polycarboxylic acid to the membrane through the aldehyde groups.

In one embodiment of the invention, the polycarboxylic acid utilized is a polyamino acid. Polyamino acids that may be utilized in the present invention include copolymers of amino acids having a free amine functionality, e.g. polyglutamic acid, polyaspartic acid and any mixtures thereof. The free. amine functional group is reacted with an aldehyde group carried by the membrane by means of a Schiff-base linkage in a manner well known in the art. This completes the attachment of the polyamino acid to the membrane.

In accordance with an alternative embodiment of the present invention, the polycarboxylic acid may be a polyalkenoic acid. Polyalkenoic acids that may be utilized in the present invention include polyvinyl sulfonate, polystyrene sulfonic acid, polyvinyl acetic acid, polystyrene sulfonic acid, polypentanoic acid and any mixtures thereof. Of course, it should be appreciated that the polyalkenoic acid may not be directly attached to an aldehyde group of the membrane. First, it is necessary to react a linker molecule to the aldehyde group of the membrane. Such a linker molecule may include any molecule containing both an amine group and a vinyl group such as, for example, p-aminostyrene. After attaching a linker molecule to the aldehyde group of the membrane by means of a Schiff-base linkage, the polyalkenoic acid is reacted with the vinyl group of the linker molecule. This reaction or attachment is completed via co-polymerization using an initiator such as hydrogen peroxide.

In accordance with yet another alternative embodiment, the polycarboxylic acid may be a polypeptide including an amine functional group. Such a polypeptide may include, for example, native or denatured proteins, synthetic peptides (linear or cyclic) and any mixtures thereof. The free amine functional group is reacted with an aldehyde group carried by the membrane via a Schiff-base linkage in the same manner as a polyamino acid.

Utilizing this method it is possible to provide a membrane based sorbent wherein the available metal binding sites are multiplied and, therefore, the sequestration capacity of the membrane is significantly enhanced, perhaps between twenty and a hundred fold.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing.

Figure 1:
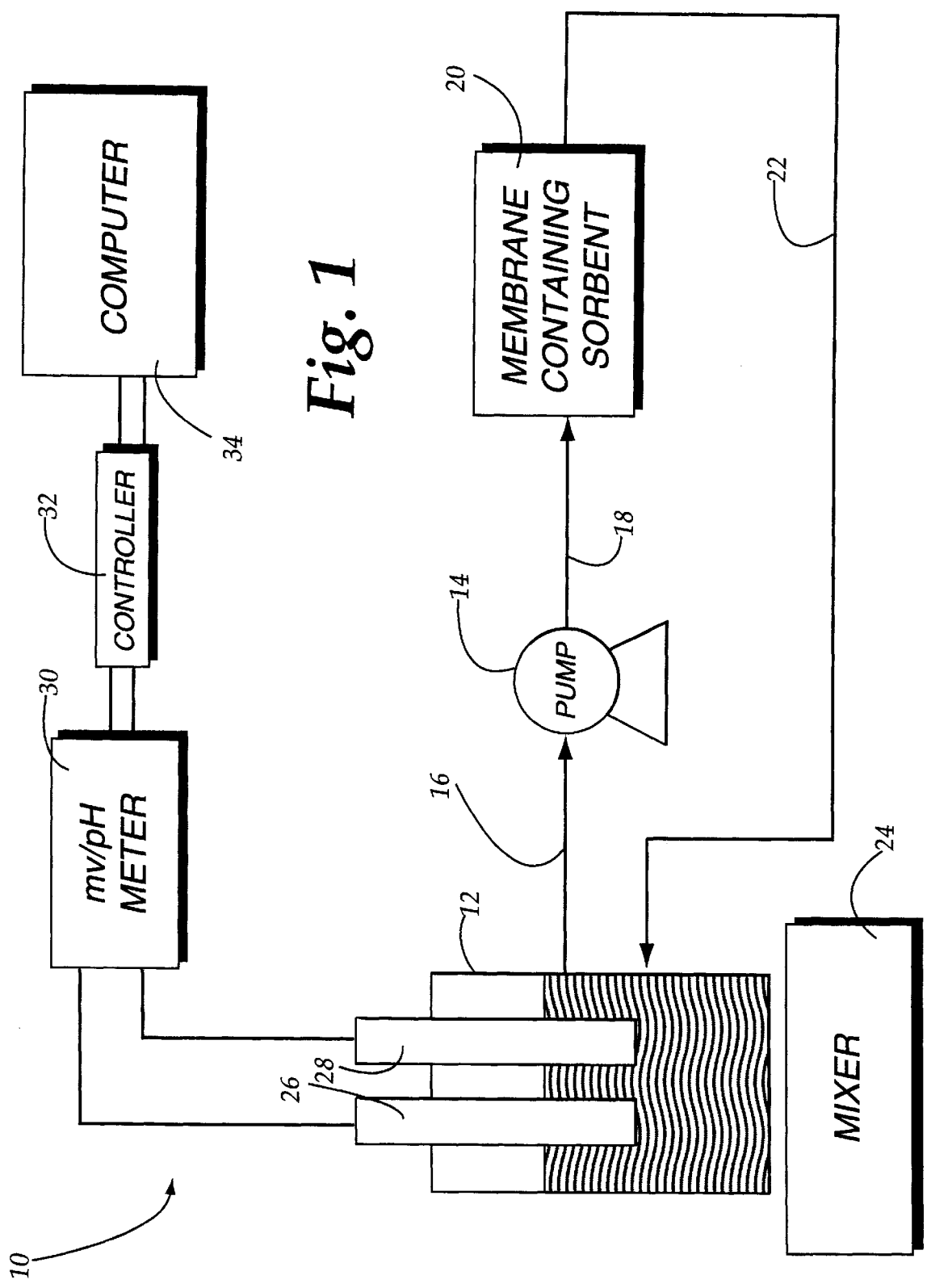
FIG. 1 is a schematic illustration of the membrane based sorbent of the present invention being utilized as a sorbent for heavy metal ion entrapment utilizing a convective flow filtering system.

Reference will now be made in detail to the present preferred embodiment of the invention, an example of which is illustrated in the accompanying drawing.

DETAILED DESCRIPTION OF THE INVENTION

In accordance with the present invention, a process is provided for making a membrane-based sorbent. The process includes the step of selectively hydrolyzing a membrane constructed from a material such as a polyacetylated polymer including but not limited to cellulose acetate, cellulose diacetate and cellulose triacetate.

Preferably, this hydrolyzing is completed under alkaline conditions using, for example, sodium hydroxide, potassium hydroxide, ammonium hydroxide or any mixture thereof as the active reagent. The hydrolyzing is completed in order to deacetylate a surface layer of the cellulosic membrane and thereby expose a number of free hydroxyl groups. This hydrolysis step is not necessary for cellulose or other polyhydrated material.

Next is the oxidizing of the exposed free hydroxyl groups in order to convert those groups to aldehyde groups. This step may be performed utilizing an aqueous solution of sodium periodate under relatively mild conditions such as described in T. P. Newell, *Meth. Carbohydr. Chem.*, 1963, 3, 164–8, "$NaIO_4$ oxidation of cellulose" or *Modern Carbohydrate Chemistry*, R. W. Binkley, Marcel Dekker, New York, 1988, page 232. Of course, other known oxidizing agents that are appropriate for this purpose may be utilized. Furthermore, for materials such as polyether sulfone containing aldehydes and derivatized silica, both the hydrolysis and oxidation steps are not necessary.

This step is then followed by the attachment of a polycarboxylic acid to the membrane through the aldehyde groups. More specifically, these aldehyde groups provide ideal attachment sites for materials that possess a free amine functionality through the formation of Schiff-base linkage in the manner described in "Organic Functional Group Preparations" W. Karo and S. R. Sandler (eds.) 1989, Second Edition, Vol. II, Chapter 12, Academic Press.

Polycarboxylic acids that may be attached to the membrane through the aldehyde groups include, but are not limited to polyamino acids, polyalkenoic acids and even polypeptides. More specifically, a free amine functionality or group of the polyamino acid is reacted with one of the aldehyde groups of the membrane with attachment completed through the Schiff-base linkage.

Polyamino acids that may be attached to the membrane in accordance with the present method include but are not limited to polyglutamic acid, polyaspartic acid, polylysine, polycysteine and any mixtures thereof. Enantiomerically pure or mixed poly-L and poly-D acids may be used. Further, co-polymers of the various polyamino acids may also be utilized.

Specifically, the polyamino acid selected is introduced to the membrane in a distilled water solution wherein the pH is maintained at alkaline conditions (e.g. approximately 9.2±0.1). Next, sodium borohydrate is added to the solution containing the membrane and the pH is maintained at approximately 8.0±0.5 utilizing nitric acid. At approximately 60 minutes the membrane is rinsed with water.

In accordance with another aspect of the present invention, the polycarboxylic acid attached to the membrane through the aldehyde groups may be a polyalkenoic acid. Generally, such acids are cheaper than the polyamino acids. Polyalkenoic acids that may be utilized in the present method include but are not limited to poly vinyl sulfonic acid, polyacrylic acid, polyvinyl acetic acid, polystyrene sulfonic acid, polypentanoic acid and any mixtures thereof.

The polyalkenoic acid selected is attached by first reacting a linker molecule to at least one of the aldehyde groups of the membrane. More specifically, the linker molecule may be any molecule containing both an amine group for Schiff-base linkage to the aldehyde of the membrane and a vinyl group for polymerization to the polyalkenoic acid. An example of such a molecule is p-aminostyrene. The p-aminostyrene molecule is attached to the aldehyde of the membrane by Schiff-base linkage in the same manner as the attachment of the polyamino acid as discussed above. The polyalkenoic acid is then attached to the free vinyl group of the p-aminostyrene molecule by polymerization reaction.

More specifically, two approaches described below use polyacrylic acid as an example. First one can prepare oligomers of polyacrylic acid in solution then contact the oligomers in pores of the membrane where the p-aminostyrene modified membrane acts as a chain terminator. Second, one can contact monomers of polyacrylic acid in the pores of the membrane and perform the polymerization in-situ. In either approach, a polymerization solution is prepared and any inhibitor such as p-methoxyphenol, is removed in a manner known in the art. Polymerization is initiated by raising the temperature of the reagent solution to, for example, 90–100° C. in the presence of an initiator such as hydrogen peroxide or potassium persulfate in a manner well known in the art.

In accordance with still another aspect of the present invention, a polypeptide including an amine group may be bound by Schiff-base linkage to the aldehyde group of the membrane. This is done in the same manner as described above with respect to the attachment to the polyamino acid.

Polypeptides that may be utilized in the present process include those with a free amine group for Schiff-base linkage to the membrane. Specific examples include but are not limited to native or denatured proteins, synthetic peptides (linear or cyclic) and any mixtures thereof.

In accordance with yet another aspect of the present invention, convective flow techniques may be utilized to selectively hydrolyze the membrane and oxidize any exposed free hydroxyl groups as well as attach a carboxylic acid to the membrane. As more specifically described in the examples that follow, the membrane to be treated is placed in a convective flow cell of known construction and the various reagents are cycled through the membrane at the desired rate in order to complete the process.

The cycling of the reagent solutions through the pores of the membrane a number of times under mild pressure conditions achieves high reaction yields while using relatively dilute reagent concentrations. Such low concentration solutions have insignificant environmental impact. Further, this approach reduces the amount of physical surface adsorption and prevents undesirable side-reactions such as those normally associated with prolonged reaction times. Such side reactions include but are not limited to excessive hydrolysis of cellulose acetate or penetration of oxidizing agent beyond the surface layer of cellulose molecules.

Advantageously, the process of any embodiment of the present invention allows one to activate the surface of the membrane by means of attachment of a large number of long chain polymer units containing multiple metal binding sites. Accordingly, the sequestration capacity of the membrane is dramatically enhanced. For example, a poly carboxylic acid containing approximately 60 acid groups per chain raises the capacity of a membrane (100 $m^2/gm$) from, for example, 0.034 grams of nickel per gram of inactivated membrane to 1.0 gram of nickel per gram of membrane. If the metal species to be sequestrated is cadmium (II), then the attachment of polymer chains containing only 21 carboxylic acid groups is sufficient to obtain 1.0 gram of cadmium uptake per gram of membrane.

In accordance with still another aspect of the present invention, convective flow techniques are utilized to improve the efficiency of metal ion sequestration. This procedure is illustrated in FIG. 1.

The convective flow system 10 includes a feed tank 12 for holding the waste water solution from which heavy metal ions are to be sequestered. A pump 14 delivers the waste water solution through the conduits 16, 18 and passes this solution through the pores in a membrane 20 processed in accordance with the teachings of this invention. As the waste water passes through the membrane 20, metal ions are bound to the available metal binding sites carried on the membrane. The treated waste water is then recycled through the conduit 22 back to the feed tank 12. A mixer 24 agitates the solution in the feed tank 12 in order to maintain homogeneity.

Metal ion selective electrode 26, a pH electrode 28 and a mv/pH meter 30 may be utilized to monitor the pH and the uptake or sequestration of heavy metal ions. In fact, this may be done automatically by connecting the output of the mv/pH meter(s) 30 to a controller 32 (i.e. gain control for signal sensitivity) and personal computer 34 operating under direction of an appropriate data acquisition system and post data plotting software such as, for example, the Excel software program, available from Microsoft. Advantageously, the use of a convective flow system 10 of the type described significantly reduces the cycle time required for maximum heavy metal sorption by the membrane 20.

Figure 2:
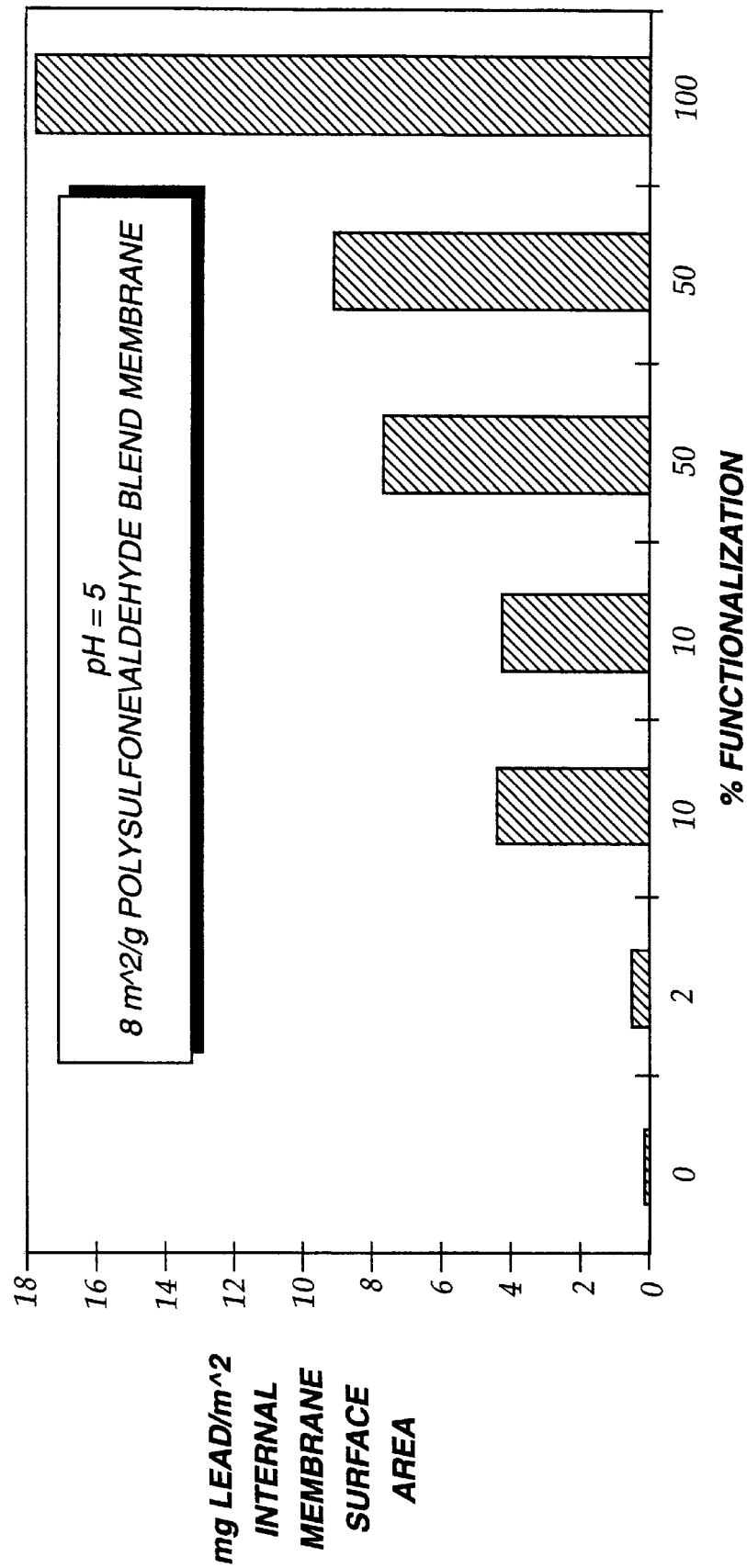
FIG. 2 graphically illustrates the increased sorption ability of such a membrane.
Figure 3:
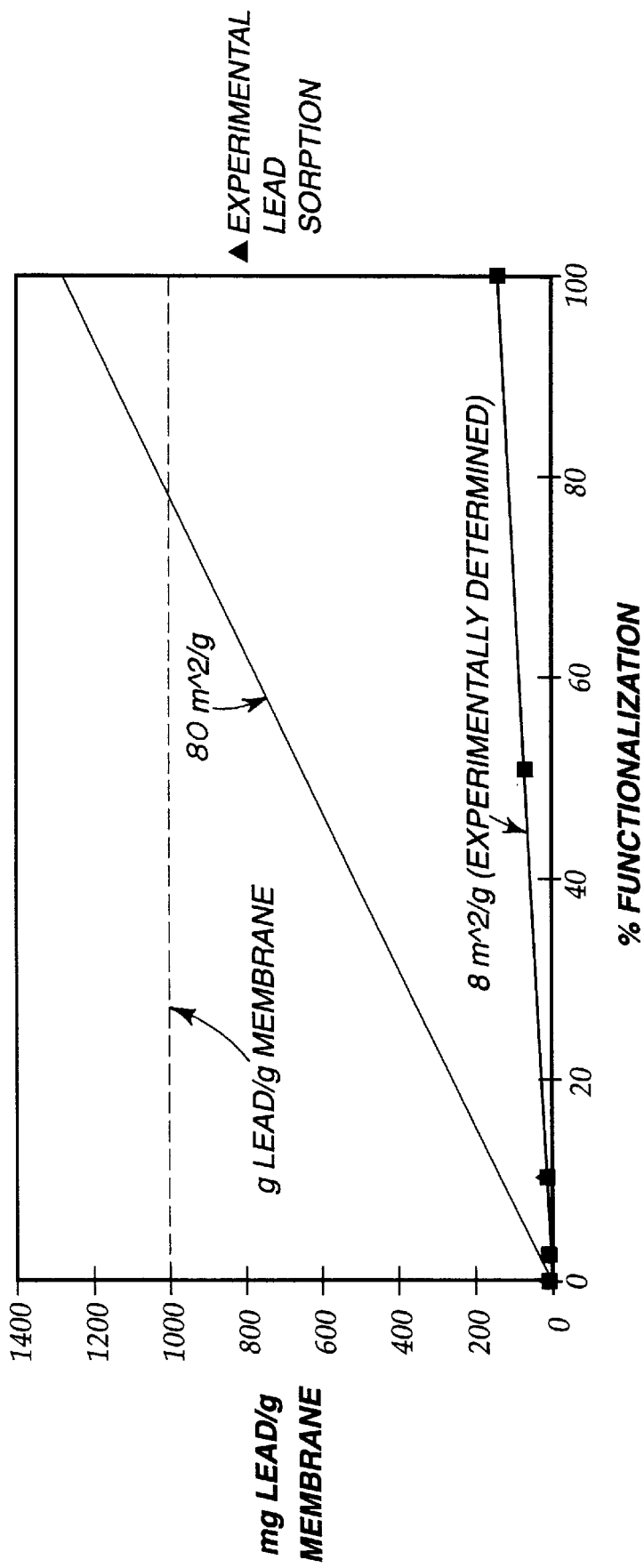
FIG. 3 graphically illustrates the role of membrane surface area as it relates to metal sorption capacity.

FIG. 2 shows the increased lead sorption ability of a membrane made in accordance with the present process with an increased degree of functionalization by poly-L-glutamic acid. Relatively high pick-up is observed even at 50% functionalization. The role of membrane surface area in metal sorption capacity is shown in FIG. 3. FIG. 3 indicates that with a membrane of 80 $m^2/g$ with only 80% of poly-carboxylic acid derivatization, one may obtain 1 gram of lead pickup per gram of membrane. By increasing the membrane surface area and percent carboxylic acid derivatization, higher heavy metal pick up (more than 1 gram per gram of membrane) may be achieved.

The following examples are presented to illustrate the invention, but it is not to be considered as limited thereto.

EXAMPLE 1

A stock solution of 0.11 M sodium hydroxide (NaOH) solution was made by mixing 2.2 g NaOH (obtained from Fisher) in 500 ml distilled water in a 500 ml flask. A solution of 1.4 M Ammonium Hydroxide ($NH_4OH$) was made by mixing 50 ml concentrated $NH_4OH$ (Fisher #A669-212) with 450 ml purified water for a total solution volume of 500 ml in a 500 ml flask. A stock solution of phosphate buffer was made by mixing 12 g sodium phosphate dibasic (obtained from Sigma) in one liter distilled water in a one liter flask. The solution pH was adjusted to 8.0 using nitric acid (obtained from Aldrich).

A 4.2 cm external diameter cellulose acetate membrane (60 mg wet weight, 0.22 μm pore size) was placed in a convective flow cell. The cellulose acetate membrane was rinsed for 25 minutes at a permeate flow rate of 5 ml/min and pH 7.9 (pH adjusted using NaOH). Next, 125 ml of the NaOH stock solution was mixed with 125 ml of the $NH_4OH$ stock solution using a 250 ml graduated cylinder. The solution was poured into a 400 ml beaker, mixed thoroughly, and permeated through the membrane at 5 ml/min in continuous recycle for 40 minutes. The membrane was then rinsed again using pH 7.9 distilled water at 5 ml/min for 25 minutes. Next, 1 g of sodium periodate (Fisher #S678-25) was mixed with 100 ml of the phosphate buffer in a 100 ml flask. This solution was transferred into a 100 ml beaker, continuously stirred, and permeated (5 ml/min) through the membrane for 100 minutes. The membrane was rinsed for 25 minutes using the above prepared phosphate buffer. The Membrane was stored in a small jar containing approximately 50 ml of phosphate buffer.

EXAMPLE 2

A stock solution of lead. ($Pb^{+2}$) was made by mixing 218 mg lead nitrate (equivalent to 136 mg $Pb^{+2}$) (Fisher #L62-100) in one liter of distilled water in an one liter flask. The solution pH was adjusted to 5.0. A stock solution of Poly-L-Glutamic Acid (PLGA, Aldrich #38,683-9) at 40 mg/L was made by mixing 10 mg PLGA in 250 ml of distilled water using a 250 ml flask. The solution pH was adjusted to 9.2 using NaOH.

A membrane prepared using the procedure per Example 1 was put in a convective flow cell. The next part of the functionalization procedure can be broken into two steps. The first step attaches the PLGA to the membrane surface and the second step allows for heavy metal sequestration.

For the PLGA attachment, the membrane was rinsed with distilled water at pH 9.2 for 25 minutes. Next, a sample containing 25 ml of the PLGA stock solution in a 50 ml beaker was permeated through the membrane (5 ml/min) for 60 minutes. The solution pH was continuously adjusted using NaOH keeping it at 9.2±0.1. A solution of 100 ml of the phosphate buffer made in Example 1 was placed in a 100 ml beaker and 200 mg sodium borohydride (Fisher #S678-25) was also added. This solution was permeated through the membrane at 5 ml/min for 60 minutes keeping the pH 8.0±0.5 using nitric acid. The membrane was rinsed for 53 minutes with pH 4.0 water until the pH into the membrane, was equal to the pH out of the membrane within 0.1 pH units.

Finally, the PLGA functionalized membrane was exposed to a lead nitrate stock solution for heavy metal sequestration. For this procedure 25 ml of the above mentioned lead solution was permeated (5 ml/min) through the membrane for 180 minutes as per FIG. 1. The pH of the feed solution was maintained between 5.2 and 5.7 using sodium hydroxide. On-line data acquisition by computer allowed us to observe the trend in lead concentration changes with time. The final lead nitrate solution was also analyzed directly using a pre-calibrated ion-selective lead electrode (Orion #9682BN) and the results showed that the final lead concentration in the feed beaker went from 136 mg/L to 16 mg/L as Pb.

EXAMPLE 3

This is the same as Example 2 except that polyaspartic acid is substituted for poly-L-glutamic acid.

EXAMPLE 4

This is the same as Example 2 except that polylysine is substituted for poly-L-glutamic acid.

EXAMPLE 5

This is the same as Example 2 except that polycysteine is substituted for poly-L-glutamic acid.

EXAMPLE 6

An amount of 50 mg of p-aminostyrene is added to an aldehyde-containing membrane prepared as explained in Example 1. p-Aminostyrene contains an amine functionality for attachment to the aldehyde containing membrane and a vinyl functionality. The coupling of p-aminostyrene to the support is performed under convective flow conditions at 5 ml/min. Next, the membrane is rinsed as described in Example 1, leaving attached a vinyl functionality on the membrane.

The polymerization solution is prepared from commercially available acrylic acid. Since this acrylic acid contains an inhibitor, p-methoxyphenol, the inhibitor is removed by either percolation through a column of alumina that had been preactivated by drying in an oven at ~200° C. overnight or by distillation ("Purification of Laboratory Chemicals", D. D. Perrin et al. , Pergamon Press, Oxford, 1988, p11 and p 73 and references therein). Acrylic acid is polymerized in-situ by a radical polymerization reaction. (persulfate/heat process). For that, a 10% v/v acrylic acid solution is made 0.2% in $(NH_4)_2S_2O_8$ and passed through the membrane under convective flow. Polymerization is initiated by raising the temperature of the solution to 90–100° C., while continuing the convective flow through the membrane. The vinyl functionality on the membrane assures that a polymer of acrylic acid becomes attached to the membrane. The procedure to evaluate the membrane for heavy metal sorption is the same as the one outlined in Example 2, but instead of polyglutamic acid the membrane now contains an attached polyacrylic acid.

EXAMPLE 7

This is the same as Example 6 except that polyvinyl sulphonic acid is substituted for polyacrylic acid.

EXAMPLE 8

This is the same as Example 6 except that polyvinyl acetic acid is substituted for polyacrylic acid.

EXAMPLE 9

This is the same as Example 2 except the native protein phytochelatin is substituted for polyamino acid.

EXAMPLE 10

This is the same as Example 2 except that the denatured protein gelatin is substituted for polyamino acid.

EXAMPLE 11

This is the same as Example 2 except that the linear peptide aspartate-aspartate-aspartate-glutamate-aspartate is substituted for polyamino acid.

EXAMPLE 12

This is the same as Example 2 except that the cyclic peptide cyclo (prolin-phenylaniline-tryptophanlysine-threonine-phenylaniline) is substituted for polyamino acid.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, where a membrane has undergone preactivation and exposed aldehyde groups are already present, the hydrolyzing and oxidizing steps may be skipped and the process may begin with the polycarboxylic acid attaching step.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A process for making a membrane-based sorbent suitable for metal ion sequestration comprising:

selectively hydrolyzing a microporous membrane constructed from a polyacetylated cellulosic material in order to deacetylated a surface layer of said membrane and expose free hydroxyl groups;

oxidizing said exposed free hydroxyl groups to aldehyde groups;

attaching a polyamino acid to said cellulosic membrane through said aldehyde groups.

2. The process of claim 1, wherein said cellulosic membrane is partially hydrolyzed under alkaline conditions.

3. The process of claim 1, wherein said oxidizing is completed using an aqueous solution of sodium periodate.

4. The process of claim 1, wherein said polyamino acid is attached by reacting a free amine functionality of said polyamino acid with one of said aldehyde groups.

5. The process of claim 4, wherein said polyamino acid is selected from a group consisting of polyglutamic acid, polyaspartic acid, polylysine, polycysteine and any mixtures thereof.

6. The process of claim 1, further including utilizing convective flow techniques to cycle hydrolyzing reagent, oxidizing reagent and said polycarboxylic acid through pores in said membrane at pressure.

* * * * *

UNITED STATES PATENT AND TRADEMARK OFFICE
CERTIFICATE OF CORRECTION

PATENT NO : 6,103,121
DATED : August 15, 2000
INVENTOR(S) : Dibakar Bhattacharyya et al.

It is certified that error appears in the above-identified patent and that said Letters Patent are hereby corrected as shown below:

Claim 1, Column 9, line 12, replace "deacetylated" with - - deacetylate - -.
Claim 6, Column 10, line 15 before the word "pressure" insert - - low - -.

Signed and Sealed this

Tenth Day of April, 2001

Attest:

NICHOLAS P. GODICI

Attesting Officer     Acting Director of the United States Patent and Trademark Office